(12) United States Patent
Tarr

(10) Patent No.: US 8,132,279 B1
(45) Date of Patent: Mar. 13, 2012

(54) DISHWASHER THAT HOLDS WATER FOR USE DURING PEAK ELECTRICITY DEMAND AND ASSOCIATED METHOD OF CONTROL

(75) Inventor: Ronald Scott Tarr, Louisville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/192,673

(22) Filed: Jul. 28, 2011

Related U.S. Application Data

(62) Division of application No. 12/911,954, filed on Oct. 26, 2010, now Pat. No. 8,001,810.

(51) Int. Cl.
*D06F 39/04* (2006.01)
(52) U.S. Cl. ............... 8/158; 68/15; 134/18; 134/19
(58) Field of Classification Search .......... 8/158; 68/15; 134/18, 19
See application file for complete search history.

(56) References Cited

U.S. PATENT DOCUMENTS

| | | | |
|---|---|---|---|
| 4,070,204 A | 1/1978 | Hardy et al. | |
| 4,237,859 A | 12/1980 | Goettl | |
| 5,317,670 A | 5/1994 | Elia | |
| 5,606,878 A | 3/1997 | Arreghini et al. | |
| 5,636,287 A * | 6/1997 | Kubli et al. | 381/71.2 |
| 5,660,193 A | 8/1997 | Archer et al. | |
| 6,550,488 B2 | 4/2003 | McKee | |
| 6,861,621 B2 | 3/2005 | Ghent | |
| 7,776,159 B2 | 8/2010 | Hooker et al. | |
| 7,884,498 B2 * | 2/2011 | Ecker et al. | 307/35 |
| 2006/0260656 A1 | 11/2006 | Berner | |
| 2007/0283982 A1 | 12/2007 | Elick et al. | |
| 2007/0295361 A1 | 12/2007 | Thiyagarajan et al. | |
| 2008/0023042 A1 | 1/2008 | Jayakaran | |
| 2009/0157529 A1 * | 6/2009 | Ehlers et al. | 705/26 |
| 2010/0084340 A1 | 4/2010 | Monsrud et al. | |

FOREIGN PATENT DOCUMENTS

| | | |
|---|---|---|
| JP | 04-053520 | 2/1992 |
| JP | 06-030873 | 2/1994 |
| JP | 06-046980 | 2/1994 |
| JP | 07-000331 | 1/1995 |
| JP | 2002-078661 | 3/2002 |
| JP | 2006-239274 | 9/2006 |
| KR | 2006007827 | 1/2006 |
| KR | 2007044675 | 4/2007 |

\* cited by examiner

*Primary Examiner* — Frankie L Stinson
(74) *Attorney, Agent, or Firm* — Dority & Manning, P.A.

(57) ABSTRACT

A dishwasher and associated control method are provided wherein a water supply manifold supplies a wash chamber with wash liquid. The supply manifold includes a hot water inlet from an external hot water source and a separate inlet from a storage tank, and is configured to be selectively actuated between the hot water inlet or storage tank inlet. A controller is in communication with the supply manifold and is configured to act on a signal that is indicative of an actual or pre-defined high electricity demand period on a power supply to the hot water source. The controller is configured to generate an output control signal to the supply manifold to cause the manifold to direct substantially only water from the storage tank to the wash chamber during the high electricity demand period.

8 Claims, 2 Drawing Sheets

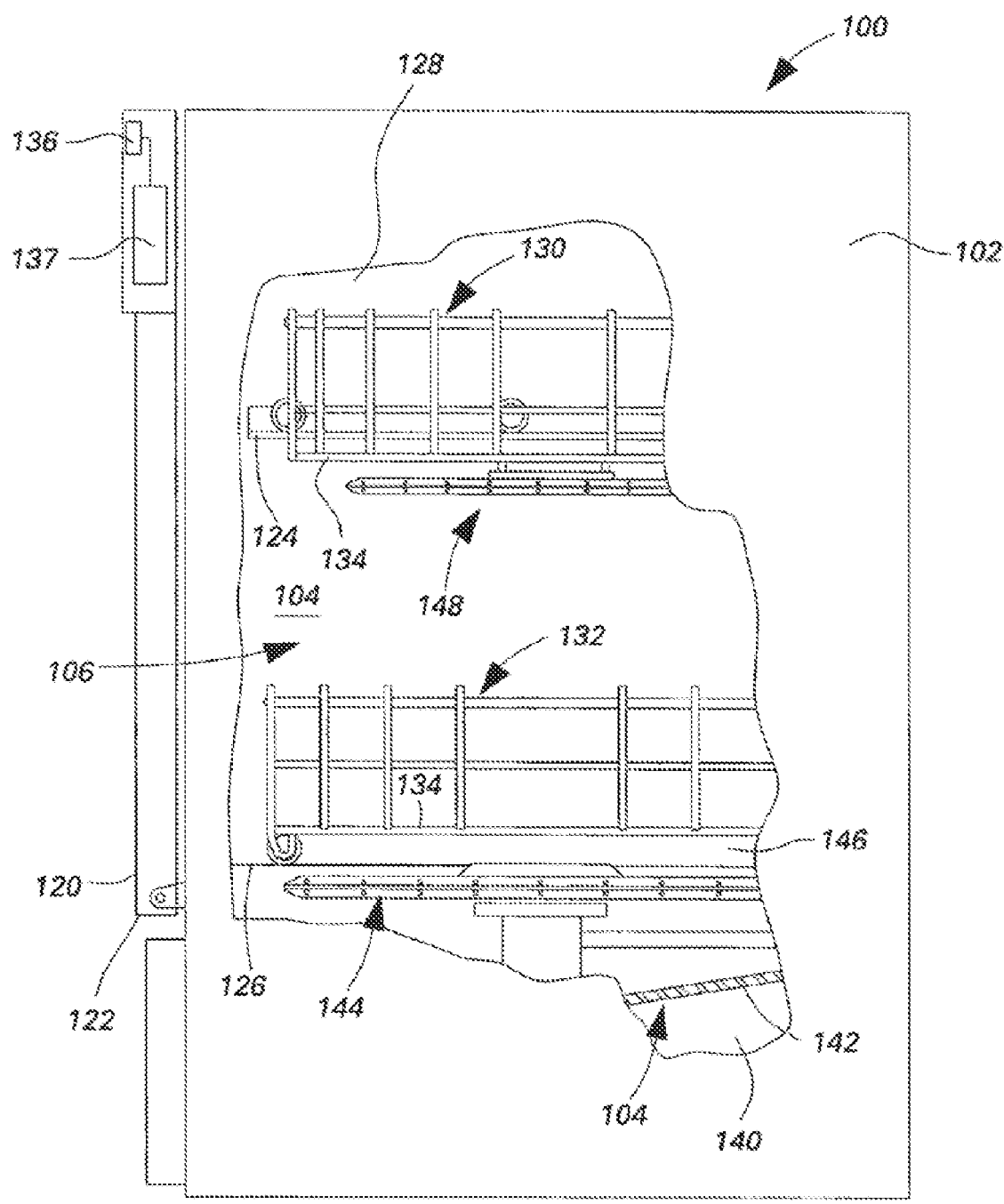
Fig. -1-

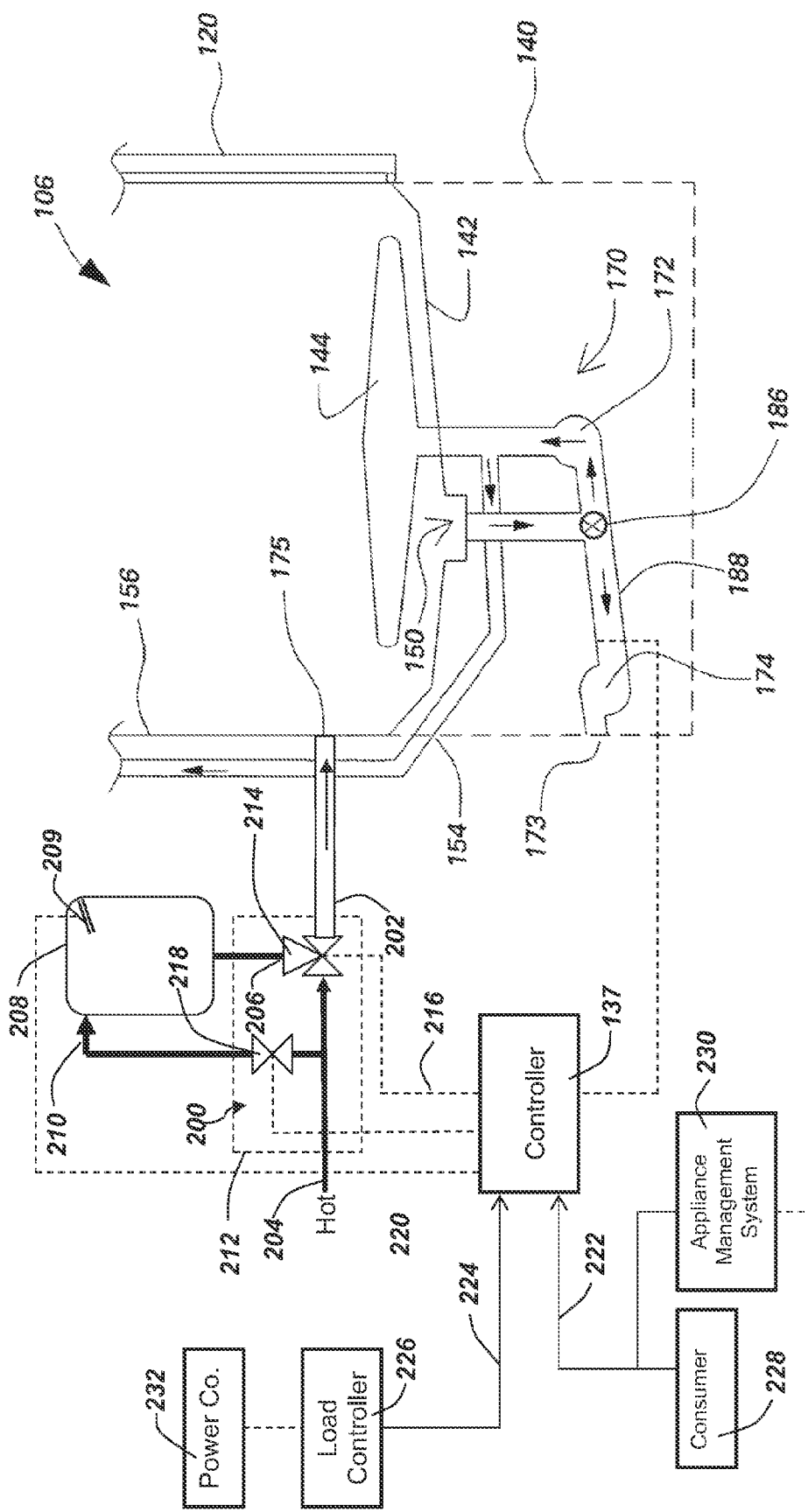
Fig. -2-

DISHWASHER THAT HOLDS WATER FOR USE DURING PEAK ELECTRICITY DEMAND AND ASSOCIATED METHOD OF CONTROL

CROSS-REFERENCE TO RELATED APPLICATION

The present invention is a Divisional Application of U.S. patent application Ser. No. 12/911,954, filed Oct. 26, 2010.

FIELD OF THE INVENTION

The present subject matter relates generally to dishwashers, and more particularly to a dishwasher that stores water for use during periods of high electricity demand.

BACKGROUND OF THE INVENTION

Reducing the amount of energy consumption by a fluid-handling dishwasher is an ongoing effort in the industry, particularly in view of the increasing worldwide energy demand and associated environmental and economic concerns. Conventional dishwashers are typically connected only to a structure's hot water supply to take advantage of the high initial temperature of the influent supply. However, a building's hot water heater (or other source of hot water) is generally a high energy consumption device, and a majority of the energy consumed by conventional dishwashers is indirectly attributed to the hot water heater.

Efforts are being made to reduce the energy consumption profile of dishwashers. For example, U.S. Pat. No. 4,070,204 describes a low-energy dishwasher connected to both hot and cold water lines, wherein cold water is used for a pre-rinse and one or more post-rinse cycles. Hot water is used for a wash cycle and a final post-rinse cycle followed an air-circulated drying cycle. Drying time is reduced by the residual heat of the dishes from the hot water post-rinse cycle. U.S. Pat. No. 7,776,159 describes a closed-loop feedback system for more efficient use of the amount of water used by a dishwasher. Likewise, U.S. Pat. Application Pub. No. 2008/0023042 describes various methods for more efficient management of water consumption of a dishwasher.

The above systems and control methods, however, still rely on hot water from an outside source (typically a high energy consumption source) as the initial influent supply to the machine for each wash cycle and, thus, the dishwasher indirectly contributes to the energy consumption of such sources. Particularly for less efficient hot water systems, this contribution can be significant.

Accordingly, it would be desirable to provide a dishwasher (and associated method of control) that reduces the dishwasher's energy consumption placed on an external hot water supply system.

BRIEF DESCRIPTION OF THE INVENTION

Aspects and advantages of the invention will be set forth in part in the following description, or may be obvious from the description, or may be learned through practice of the invention.

In an exemplary embodiment, a dishwasher is provided having a wash chamber. A water supply manifold has an outlet that is in fluid communication with the wash chamber for supplying wash liquid to the wash chamber. The manifold includes a hot water inlet supplied by an external hot water source from the building's hot water system, for example an electric water heater. The dishwasher further includes an internal or external water storage tank, with the manifold having an additional inlet in fluid communication with the storage tank. The manifold may include any manner of housing, header, valves, connections, and the like, and is configured to be selectively actuated between either the hot water inlet or the storage tank inlet. A controller is in communication with the supply manifold and is configured to act on a signal that is indicative of a high electricity demand on the system that powers the hot water source. In response to this signal, the controller is configured to generate an output control signal to the supply manifold to cause the manifold to direct substantially only water from the storage tank to the wash chamber during the high electricity demand period.

The supply manifold may further include a hot water inlet to the storage tank, with the controller further configured to control the supply manifold to fill the storage tank with hot water during non-high electricity demand periods.

In particular embodiments, the controller act on a passive signal that establishes pre-defined time periods of high electricity demand based, for example, on historical data. These time periods may be entered directly into the machine's controller by the consumer via the machine interface. In other embodiments, the times may be entered by the electricity provider company via a suitable communication link with the dishwasher, for example via an appliance management system that interfaces with the dishwasher (and other appliances in the residence).

In still other embodiments, the controller may receive an active input signal that is generated during actual periods of high electricity demand. This active signal may be provided by the electricity provider company. For example, the dishwasher may be linked to a load control device that limits power to one or more appliances in the residence during periods of high electricity demand such that the active input signal is generated during such times.

The present invention also encompasses various method embodiments for controlling a dishwasher to limit power consumption of the hot water source that supplies the dishwasher. The method includes substantially isolating the hot water supply inlet to the dishwasher and filling the wash chamber from an internal or external storage tank in response to a control signal that is indicative of an actual (active) or predicted (passive) high electricity demand on the power system. Various embodiments of the control method may relate to any of the features discussed above and described in greater detail below.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a side partial cut-away view of an exemplary dishwasher that may be configured in accordance with aspects of the invention; and FIG. 2 is a diagram view of an embodiment of a dishwasher configured in accordance with aspects of the invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As discussed in greater detail below, embodiments of the present invention relate to a dishwasher that utilizes cold water during periods of high electricity demand so as to reduce the energy consumption of the building's hot water system during such periods. FIG. 1 depicts an exemplary domestic dishwasher 100 that may be configured in accordance with aspects of the invention. It should be appreciated that the invention is not limited to any particular style, model, or other configuration of dishwasher, and that the embodiment depicted in FIG. 1 is for illustrative purposes only. For example, instead of the racks 130, 132 depicted in FIG. 1, the dishwasher 100 may be of a know configuration that utilizes drawers that pull out from the cabinet and are accessible from the top for loading and unloading of articles.

In the particular embodiment illustrated in FIG. 1, the dishwasher 100 includes a cabinet 102 having a tub 104 therein that defines a wash chamber 106. The tub 104 includes a front opening (not shown in FIG. 1) and a door 120 hinged at its bottom 122 for movement between a normally closed vertical position (shown in FIG. 1) wherein the wash chamber 106 is sealed shut for washing operation, and a horizontal open position for loading and unloading of articles from the dishwasher. Upper and lower guide rails 124, 126 are mounted on tub side walls 128 and accommodate upper and lower roller-equipped racks 130, 132, respectively. Each of the upper and lower racks 130, 132 is fabricated into lattice structures including a plurality of elongate members 134, and each rack 130, 132 is adapted for movement between an extended loading position (not shown) in which the rack is substantially positioned outside the wash chamber 106, and a retracted position (shown in FIG. 1) in which the rack is located inside the wash chamber 106. A silverware basket (not shown) may be removably attached to the lower rack 132 for placement of silverware, utensils, and the like, that are too small to be accommodated by the upper and lower racks 130, 132.

The dishwasher 100 further includes a lower spray-arm-assembly 144 that is rotatably mounted within a lower region 146 of the wash chamber 106 and above a tub sump portion 142 so as to rotate in relatively close proximity to the lower rack 132. A mid-level spray-arm assembly 148 is located in an upper region of the wash chamber 106 and may be located in close proximity to upper rack 130. Additionally, an upper spray arm assembly (not shown) may be located above the upper rack 130.

The lower and mid-level spray-arm assemblies 144, 148 and the upper spray arm assembly are fed by a fluid circulation assembly for circulating water and dishwasher fluid in the tub 104. The fluid circulation assembly may be located in a machinery compartment 140 located below the bottom sump portion 142 of the tub 104, as generally recognized in the art. Each spray-arm assembly includes an arrangement of discharge ports or orifices for directing washing liquid onto dishes or other articles located in the upper and lower racks 130, 132, respectively. The arrangement of the discharge ports in at least the lower spray-arm assembly 144 provides a rotational force by virtue of washing fluid flowing through the discharge ports. The resultant rotation of the lower spray-arm assembly 144 provides coverage of dishes and other dishwasher contents with a washing spray.

The dishwasher 100 is further equipped with a controller 137 to regulate operation of the dishwasher 100. The controller may include a memory and microprocessor, such as a general or special purpose microprocessor operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor.

The controller 137 may be positioned in a variety of locations throughout dishwasher 100. In the illustrated embodiment, the controller 137 may be located within a control panel area of door 120 as shown. In such an embodiment, input/output ("I/O") signals may be routed between the control system and various operational components of dishwasher 100 along wiring harnesses that may be routed through the bottom 122 of door 120. Typically, the controller 137 includes a user interface panel 136 through which a user may select various operational features and modes and monitor progress of the dishwasher 100. In one embodiment, the user interface 136 may represent a general purpose I/O ("GPIO") device or functional block. In one embodiment, the user interface 136 may include input components, such as one or more of a variety of electrical, mechanical or electro-mechanical input devices including rotary dials, push buttons, and touch pads. The user interface 136 may include a display component, such as a digital or analog display device designed to provide operational feedback to a user. The user interface 136 may be in communication with the controller 137 via one or more signal lines or shared communication busses.

As explained in greater detail below, in accordance with principles of the invention, the controller 137 is operable to essentially isolate the hot water supply from an outside source, such as the building's hot water heater/system (including instant-on systems) to the dishwasher during actual or pre-defined periods of high electricity demand, and to supply the dishwasher with water from an internal storage tank during such periods.

FIG. 2 illustrates an embodiment of a fluid circulation assembly 170 configured below the wash chamber 106. Although one embodiment of a fluid circulation assembly that is operable to perform in accordance with aspects of the invention is shown, it is contemplated that other fluid circulation assembly configurations may similarly be utilized without departing from the spirit and scope of the invention. The fluid circulation assembly 170 includes a circulation pump assembly 172 and a drain pump assembly 174, both in fluid communication with the sump 150. Additionally, the drain pump assembly 174 is in fluid communication with an external drain 173 to discharge used wash liquid. Further, the circulation pump assembly 172 is in fluid communication with lower spray arm assembly 144 and conduit 154 which extends to a back wall 156 of wash chamber 106, and upward along the back wall 156 for feeding wash liquid to the mid-level spray arm assembly 148 (FIG. 1) and the upper spray arm assembly. This configuration also applies to a drawer-type of dishwasher, as mentioned above.

As wash liquid is pumped through the lower spray arm assembly 144, and further delivered to the mid-level spray arm assembly 148 and the upper spray arm assembly (not shown), washing sprays are generated in the wash chamber 106, and wash liquid collects in the sump 150. The sump 150 may include a cover to prevent larger objects from entering the sump 150, such as a piece of silverware or another dishwasher item that is dropped beneath lower rack 132. A course filter and a fine filter (not shown) may be located adjacent the sump 150 to filter wash liquid for sediment and particles of predetermined sizes before flowing into the sump 150. Furthermore, a turbidity sensor may be coupled to the sump 150 and used to sense a level of sediment in the sump 150 and to initiate a sump purge cycle where the contents or a fractional volume of the contents of the sump 150 are discharged when a turbidity level in the sump 150 approaches a predetermined threshold. The sump 150 is filled with water through an inlet port 175, as described in greater detail below.

In one embodiment, a drain valve 186 is established in flow communication with the sump 150 and opens or closes flow communication between the sump 150 and a drain pump inlet 188. The drain pump assembly 174 is in flow communication with the drain pump inlet 188 and may include an electric motor for pumping fluid at the inlet 188 to an external drain system via drain 173. In one embodiment, when the drain pump is energized, a negative pressure is created in the drain pump inlet 188 and the drain valve 186 is opened, allowing fluid in the sump 150 to flow into the fluid pump inlet 188 and be discharged from fluid circulation assembly 170 via the external drain 173.

Referring to FIG. 2, a water supply manifold 200 is configured with the inlet port 175 for supplying wash liquid to the wash chamber 106. The manifold 200 has a hot water inlet 204 that receives hot water from an external source, such as a hot water heater. The manifold 200 also has a storage tank input 206 that receives water from a storage tank 208. It should be understood that the term "water supply manifold" is used herein to encompass any manner or combination of valves, lines or tubing, housing, and the like, configured for isolating the hot water supply 204 to the wash chamber 106 and supplying water from the storage tank 208 during actual or pre-defined periods of high electricity demand.

The storage tank 208 may take on any configuration and location relative to the wash chamber 106. For example, the tank 208 may be located between the cabinet 102 and the wash tub 104 along the back or sides of the tub 104. Desirably, the storage tank 208 has sufficient volume to store water for at least one complete wash cycle, and preferably more than one complete wash cycle. The storage tank 208 may or may not be insulated, and is vented by any suitable vent arrangement. The storage tank may or may not be considered as a component of the manifold 200.

It should also be appreciated that the storage tank 208 need not be internal to the dishwasher cabinet 102, but may be located externally, for example on the outside of the cabinet 102 or separate from the cabinet. The storage tank 208 may be remote from the dishwasher 100.

The manifold 200 is in communication with the controller 137 and, in response to a control signal 216 from the controller 137, is selectively actuated to a configuration that isolates the hot water inlet 204 such that substantially only water from the storage tank 208 is directed into the wash chamber 106. The manifold 200 can be configured in numerous ways to accomplish this function. For example, in the embodiment of FIG. 2, the manifold 200 includes a first controllable valve 214 that receives the control signal 216 from the controller 137. The valve 214 may be, for example, a solenoid actuated three-way valve having a first inlet in communication with the hot water inlet 204 and a second inlet in communication with the storage tank inlet 206. The valve 214 may have an outlet in communication with the inlet port 175 to the wash chamber 106. The valve 214 may be an internal valve contained in a housing 212, with the housing 212 having various input and output connections. Alternatively, the valve 214 may be simply installed in-line in the hot water input line 204 with a separate connection to the storage tank 208. A small pump (not illustrated) may be used to move water from the storage tank 208 into the wash chamber 106, particularly if the storage tank 208 is located under the wash chamber 106.

A separate selectively actuatable valve 218 may be provided for refilling the storage tank 208 through a storage tank inlet 210 from the hot water inlet 204 during periods of decreased energy use (including periods of low energy cost, for example late at night). This valve 218 may be, for example, a solenoid actuated valve that is controlled by a signal 220 from the controller 137. The valve 218 may be an internal valve within the housing 212, or separately plumbed between the hot water inlet 204 and the storage tank inlet 210.

Referring again to FIG. 2, the controller 137 may act on a "passive" control signal 222 that establishes the time periods of high electricity demand based on a schedule. For example, the controller 137 may be programmed such that the time periods from 6:00 am to 8:00 am and from 5:00 pm to 7:00 pm are deemed to be high electricity demand times. These scheduled times may vary from locale to locale, from season to season, and so forth. The scheduled times may be input by the consumer (i.e., persons responsible for operating the dishwasher) via the user interface 136 and changed at the user's discretion.

The controller 137 may also be scheduled for storage tank refill times during periods of decreased energy demand (e.g., periods of low energy cost). For the refill procedure, the tank 208 may include a fluid level sensor 209 that indicates the water level within the tank. This sensor may also be in communication with the controller 137 so that during scheduled refill times, the controller 137 may operate the valve 218 to maintain the storage tank 208 in a filled state. The sensor may simply be a liquid level switch that activates upon the water level within the tank 208 reaching a defined height.

In an alternate embodiment, the dishwasher may be interfaced with an intelligent appliance management system 230 that controls operation of any number of connected appliances, and which can be remotely controlled. For example, the appliance management system 230 may be in direct communication with the power company 232 (electricity provider) whereby the company 232 may remotely interface with the system 230 to schedule/change the defined time periods of high electricity demand.

The controller 137 may also be configured for receipt of an "active" control signal 224 that is generated during actual (measured) time periods of high electricity demand. This active signal may be provided by the power company 232 via the appliance management system 230, as discussed above.

In an alternative embodiment, the active control signal 224 may be generated by a load control device 226 that is configured with the structure in which the dishwasher is utilized. "Load controllers" are well know in the residential electricity distribution industry and need not be described in detail herein. In general, the load controller is connected to high power consumption devices, such as heat pumps, hot water heaters, and so forth, and at setpoint power usage conditions entered by the homeowner or power company, the load controller "sheds" (i.e., shuts off) the loads. The controller 137 may be interfaced with such a load controller such that when the hot water heater (or any other load) is shed, the controller 137 generates the active control signal 220 to the manifold 200 to isolate the hot water supply from the dishwasher 100.

In still a further embodiment, the controller 137 may also be configured to independently determine periods of high energy usage without reliance on outside command signals. For example, the controller 137 may be provided with an internal clock for establishing/modifying such times of high energy usage. Alternatively, the controller 137 may monitor energy use of the building (via wire or wireless receipt of loads and/or power consumption information) and make a determination based on such information.

It should also be appreciated that, during periods of low energy use, the dishwasher would operate in a "normal" mode wherein water is supplied to the wash chamber 106 via the hot water inlet 204.

In order to minimize the growth of organics in the storage tank 208, the controller 137 may also be programmed with a "refresh" function, wherein water in the storage tank is dumped to the drain 186 if not used within a certain defined time, with the tank being subsequently refilled.

The present invention also encompasses various method embodiments of operating a dishwasher 100 in accordance with the principles discussed above to substantially isolate the hot water supply and to fill the dishwasher from a storage tank during periods of actual or pre-defined high electricity demand so as to reduce the energy consumption placed on the building's hot water system during such periods.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a dishwasher having a wash chamber selectively supplied with water from either a hot water supply inlet in fluid communication with a hot water source or from an internal storage tank, the method comprising substantially isolating the hot water supply inlet during periods of high electricity demand and filling the wash chamber with water from a storage tank so as to reduce the energy consumption placed on the hot water source by the dishwasher during the period of high electricity demand.

2. The method as in claim 1, further comprising refilling the storage tank from the hot water supply inlet during non-high electricity demand periods.

3. The method as in claim 1, wherein the hot water supply inlet is isolated during scheduled time periods that are pre-defined to correspond to times of high electricity demand.

4. The method as in claim 3, wherein the scheduled times are determined by an electricity provider company.

5. The method as in claim 3, wherein the scheduled times are determined and entered in the dishwasher controller by a consumer that utilizes the dishwasher.

6. The method as in claim 1, wherein the hot water supply inlet is isolated during actual detected times of high electricity demand.

7. The method as in claim 6, wherein the actual times of high electricity demand are determined by an electricity provider company.

8. The method as in claim 7, wherein the dishwasher is in communication with a load control device associated with a building structure in which the dishwasher is located, the load control device controlled the electricity provider company to limit electrical consumption of devices within the building structure.

* * * * *